(12) United States Patent
Roumeliotis et al.

(10) Patent No.: US 7,818,082 B2
(45) Date of Patent: Oct. 19, 2010

(54) METHOD AND APPARATUS FOR PLANNING A MANUFACTURING SCHEDULE USING AN ADAPTIVE LEARNING PROCESS

(75) Inventors: George Roumeliotis, Menlo Park, CA (US); Jonathan Louis Knight, San Mateo, CA (US)

(73) Assignee: TT IP, LLC, Marshall, TX (US)

( * ) Notice: Subject to any disclaimer, the term of this patent is extended or adjusted under 35 U.S.C. 154(b) by 276 days.

(21) Appl. No.: 12/010,476

(22) Filed: Jan. 25, 2008

(65) Prior Publication Data

US 2008/0140244 A1 Jun. 12, 2008

Related U.S. Application Data

(60) Division of application No. 11/382,093, filed on May 8, 2006, now Pat. No. 7,406,359, which is a continuation of application No. 10/846,204, filed on May 14, 2004, now Pat. No. 7,043,320, and a continuation of application No. 10/687,032, filed on Oct. 16, 2003, now abandoned.

(51) Int. Cl.
*G06F 19/00* (2006.01)

(52) U.S. Cl. ........................ 700/101; 700/100

(58) Field of Classification Search ............... 700/97, 700/99–107
See application file for complete search history.

(56) References Cited

U.S. PATENT DOCUMENTS 6,233,493 B1 * 5/2001 Cherneff et al. ............... 700/95

* cited by examiner

*Primary Examiner*—Ryan A Jarrett
(74) *Attorney, Agent, or Firm*—Hershkovitz & Associates, LLC; Abraham Hershkovitz

(57) ABSTRACT

An apparatus and method for a production planning system using a process of adaptive learning is disclosed. A production planning system receives, production objects wherein each production object has at least one attribute. In one embodiment, the production objects include information relating to product to be manufactured. After receipt of production objects, multiple preference scores according to the attributes of the production objects are calculated. In one embodiment, each preference score represents desirability of transition from manufacturing a first object to a second object. The system subsequently identifies a suggested production plan which includes a sequence order of two or more objects in response to the preference scores. In one embodiment, the planning preferences are updated or modified by an adaptive learning system in response to adjustments of the suggested production plant by a planner.

20 Claims, 10 Drawing Sheets

METHOD AND APPARATUS FOR PLANNING A MANUFACTURING SCHEDULE USING AN ADAPTIVE LEARNING PROCESS

CROSS-REFERENCE TO RELATED APPLICATIONS

This application is a divisional of application Ser. No. 11/382,093, filed May 8, 2006, which is a continuation of application Ser. No. 10/846,204, filed May 14, 2004, now U.S. Pat. No. 7,043,320, which is a continuation of application Ser. No. 10/687,032, filed Oct. 16, 2003, now abandoned.

FIELD OF THE INVENTION

The present invention relates to apparatus and methods for information processing. More specifically, the present invention relates to a process of planning manufacturing schedules using an adaptive learning process.

BACKGROUND

Increasing productivity, lowering manufacturing costs, and improving on-time performance are common concerns for most manufacturing plants and factories. With increasing market pressure for rapid reaction to fluctuating demand, scheduling an efficient manufacturing process, which maximizes the utilization of various resources, and minimizes equipment changeovers and downtimes, has become increasingly challenging. Historically, problems relating to the planning of manufacturing schedules are resolved by skillful technicians and planners. The planning process of a manufacturing schedule typically requires a skillful planner to make various adjustments to the planning preferences to anticipate fluctuations in demand and/or unexpected events such as equipment failure and labor issues.

In the past, the production plan for a factory has typically been generated by a planner who heuristically applies his planning preferences regarding desirable grouping, etc. of the required production tasks. These planning preferences have usually been acquired by the planner during many years of experience at the factory. Such planning preferences are often vital intellectual property of a manufacturing company. A problem is that this critical know-how may be absent when the skillful planner is absent. Another problem is that, with the increasing complexity and faster pace of production planning, the skillful planner has a more difficult time to quickly and consistently apply and/or adjust the planning preferences.

Accordingly, there is a need in the art to quantify the adjustments of planning preferences to improve the planning process for manufacturing schedules.

SUMMARY OF THE INVENTION

An apparatus and method for a production planner using a process of adaptive learning is disclosed. A production planning system receives production objects wherein each production object has at least one attribute. In one embodiment, the production objects include information relating to the product to be manufactured. After receipt of production objects, multiple preference scores according to the attributes of the production objects are calculated. In one embodiment, each preference score represents desirability of transition from manufacturing a first object to a second object. The system subsequently identifies a suggested production plan that includes a sequence order of two or more objects in response to the preference scores. In one embodiment, the planning preferences are updated or modified by an adaptive learning system in response to adjustments of the suggested production plan by a planner. Accordingly, the system is capable of learning the planning practices through the planning process rather than requiring a programmatic description of planning practices. The learned planning preferences are then used as guidance to create an optimal production plan.

Additional features and benefits of the present invention will become apparent from the detailed description, figures and claims set forth below.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
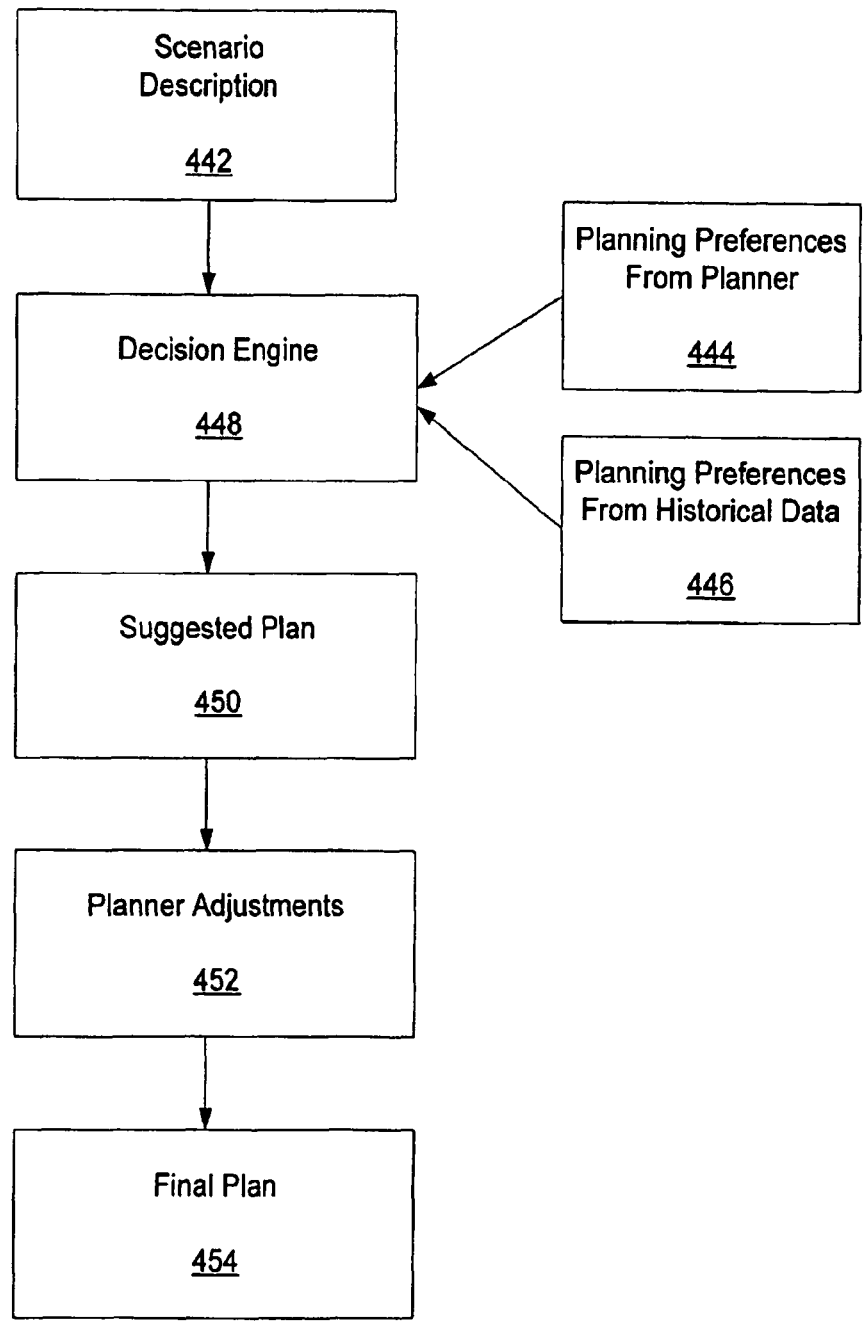
FIG. 1 is a flowchart illustrating a production planning system using planning preferences in accordance with one embodiment of the present invention.

In the following description, for purposes of explanation, numerous specific details are set forth to provide a thorough understanding of the present invention. It will be apparent, however, to one skilled in the art that these specific details may not be required to practice the present invention. In other instances, well-known circuits and devices are shown in block diagram form to avoid obscuring the present invention.

In the following description of the embodiments, substantially the same parts are denoted by the same reference numerals.

A production planning system for providing manufacturing schedules using planning preferences is disclosed. In one aspect, the production planning system generates a manufacturing schedule that includes a preferred ordering of tasks to be manufactured by a production line. The production planning system, in one embodiment, identifies multiple attributes associated with each task. Attributes identify characteristics of an item that influences production planning is decisions. For example, the attribute of Color may have possible values light, medium, and dark. Upon determination of the attributes, the production planning system computes preference scores. A preference score represents a planning preference for switching from manufacturing a first task to producing a second task. In one embodiment, the planning preferences are updated or modified by an adaptive learning system.

The adaptive learning of planning preferences includes analyzing the decisions of an expert planner and modifying planning preferences used by a decision engine. The decision engine generates a suggested plan or schedule according to the planning preferences. An advantage of using the adaptive learning is to capture an expert planner's knowledge so that a high quality production plan can be automatically generated. Another advantage of using adaptive learning is to assist a less experienced planner in producing a high quality plan. A skillful planner can also benefit from using the adaptive learning during time critical situations because the adaptive learning enhances the quality of the suggested plan. In another embodiment, the adaptive learning system monitors multiple forecasts from various planners. The forecasts involve in actual demand given historical patterns and current forecasts from different parts of the organization such as sales, marketing, and manufacturing. The system then uses the forecasts to provide a best forecast of the actual demand that mimics the decision processes of the best planner.

FIG. 1 is a flowchart illustrating a production planning system 440 using planning preferences in accordance with one embodiment of the present invention. At block 442, the process receives a scenario description. In one embodiment, the scenario description includes production requirements. The scenario description includes information relevant to the task such as demand for goods, production rates, capacities, changeover durations, etc.

At block 444, a planner provides planning preferences to a decision engine. The planner may input planning preferences from his or her own experience. In another aspect, the planner may use a digital processing device to identify preferred planning preferences.

At block 446, the process obtains planning preferences from a historical data storage. The data storage may be located in a host computer or a remote system.

At block 448, a decision engine receives data from block 442, 444, or 446. In another embodiment, the decision engine receives the data from one of the three blocks 442-446 at any given time.

At block 450, the process generates a suggested plan in accordance with the planning preferences.

At block 452, the process allows a planner to manually adjust the suggested plan as he or she determines is appropriate.

At block 454, the process generates a final plan. The final plan, in one embodiment, is forwarded to a production floor for execution. In one embodiment, the final plan is the preferred production schedule for manufacturing objects in a sequence under the available information to the production planning system.

Figure 2:
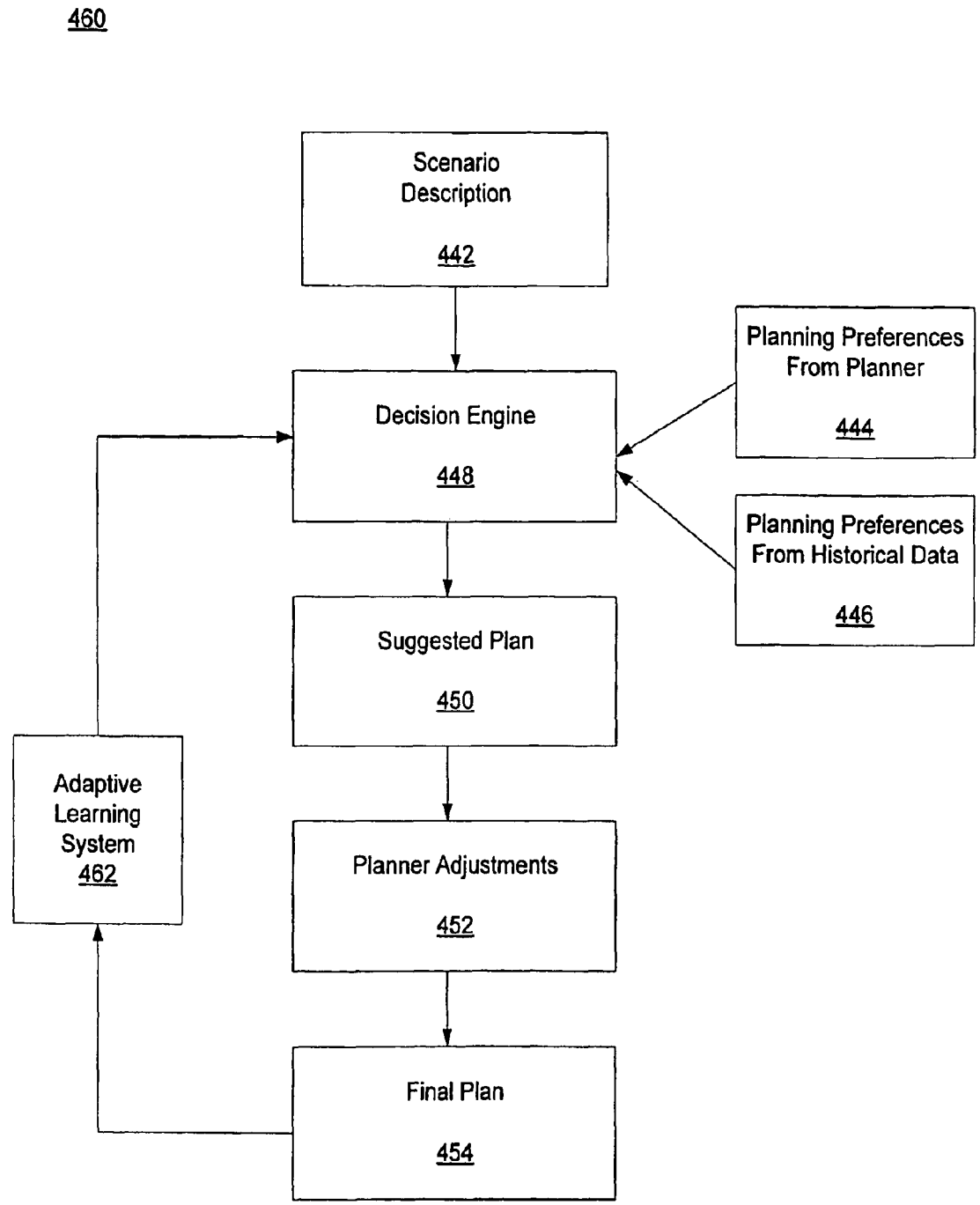
FIG. 2 is a flowchart illustrating a production planning system using an adaptive learning in accordance with one embodiment of the present invention.

FIG. 2 is a flowchart illustrating a production planning system 460 using an adaptive learning in accordance with one embodiment of the present invention. The flowchart illustrated in FIG. 2 is similar to the flowchart illustrated in FIG. 1 except block 462. At block 462, an adaptive learning system receives the final plan. In one aspect of the present invention, an adaptive learning system is capable of capturing and analyzing decisions made by an expert planner. In general, terms of the adaptive learning system, adaptive learning of planning preferences, and adaptive learning may be used interchangeably herein. In one embodiment, the adaptive learning system is used to generate an automatic production plan in accordance with the production requirements or considerations. The production requirements or considerations include ingredients, attributes, grouping, etc. In another embodiment, the adaptive learning system is used to assist a less experienced planner to create a cost-effective and efficient production plan. In yet another embodiment, the adaptive learning system enables consistent application of planning preferences for decision support to generate a high-quality production plan. The adaptive learning system is also capable of analyzing the historical data by placing less emphasis on data from the distant past as compared with historical data from the recent past.

In one embodiment, the adaptive learning system is applied in the area of supply chain management. The supply chain management includes production scheduling, material procurement, sourcing, inventory placement, available-to-promise, truck loading and routing, promotions, and et cetera. The terms of production scheduling and production planning may be used interchangeably herein.

The supply chain management of material procurement, in one embodiment, is to generate a procurement plan to meet production requirements. The scenario description includes data elements and/or parameters for generating a procurement plan. For example, a selection of a vendor may be influenced by the parameters of material, quantity, price, quality and reliability. The vendor may change from month to month depending on various business factors such as vendor terms and material inventory.

The supply chain management of sourcing, in another embodiment, is to generate a sourcing plan to fulfill customer demand either from existing inventory or from new production. The scenario description may include customers, demands, inventory positions, factory capacities, transportation costs, etc.

The supply chain management of inventory placement generates an inventory plan that specifies the inventories to place at distribution centers, factory warehouses, etc. The scenario description may include firm and forecasted demand, volatility of demand, characteristics of inventory locations, etc.

The supply chain management of available-to-promise is configured to respond to various sales inquiries. The scenario description may include class of customer, firm and forecasted demand, volatility of demand, inventory positions, factory capacities, etc. The character of the available-to-promise is accuracy and real-time response.

The supply chain management of truck loading and routing, in one aspect, provides a plan for loading a truck and routing the truck for customer deliveries. The scenario description may include the customer orders, characteristics of the trucks such as weight and size constraints, routes and distances, delivery schedules, etc.

The supply chain management of promotions generates a plan for production levels and pricing of promotional items.

The scenario description may include historical campaign effectiveness, factory capacities, etc.

In one embodiment, a production planning system, which is used as a decision support system for supply chain management, includes a decision engine, wherein input of the decision engine is data elements of the scenario description and output of the decision engine is a suggested plan. The decision engine, in one embodiment, provides a mapping between the scenario description and the suggested plan. The mapping involves planning preferences, which are parameters that determine the behavior of the decision engine. After the decision engine generates a suggested plan, expert planners may modify the plan according to their past experience. For example, in a procurement decision support system, although the decision engine may suggest vendor A given the scenario description, the expert planner may change vendor A to vendor B for various reasons such as recent financial hardships of vendor A. Also, an expert planner, for example, may have heard that vendor A is facing labor disputes and therefore presents a greater business risk than vendor B. The adjusted plan becomes the final procurement plan.

The adaptive learning system observes and analyzes the scenario description and the corresponding final plan. The adaptive learning system modifies the parameters within the decision engine to produce a more efficient production schedule. The planning preferences are modified so that a more efficient production plan may be generated for similar scenario descriptions in the future.

Figure 3:
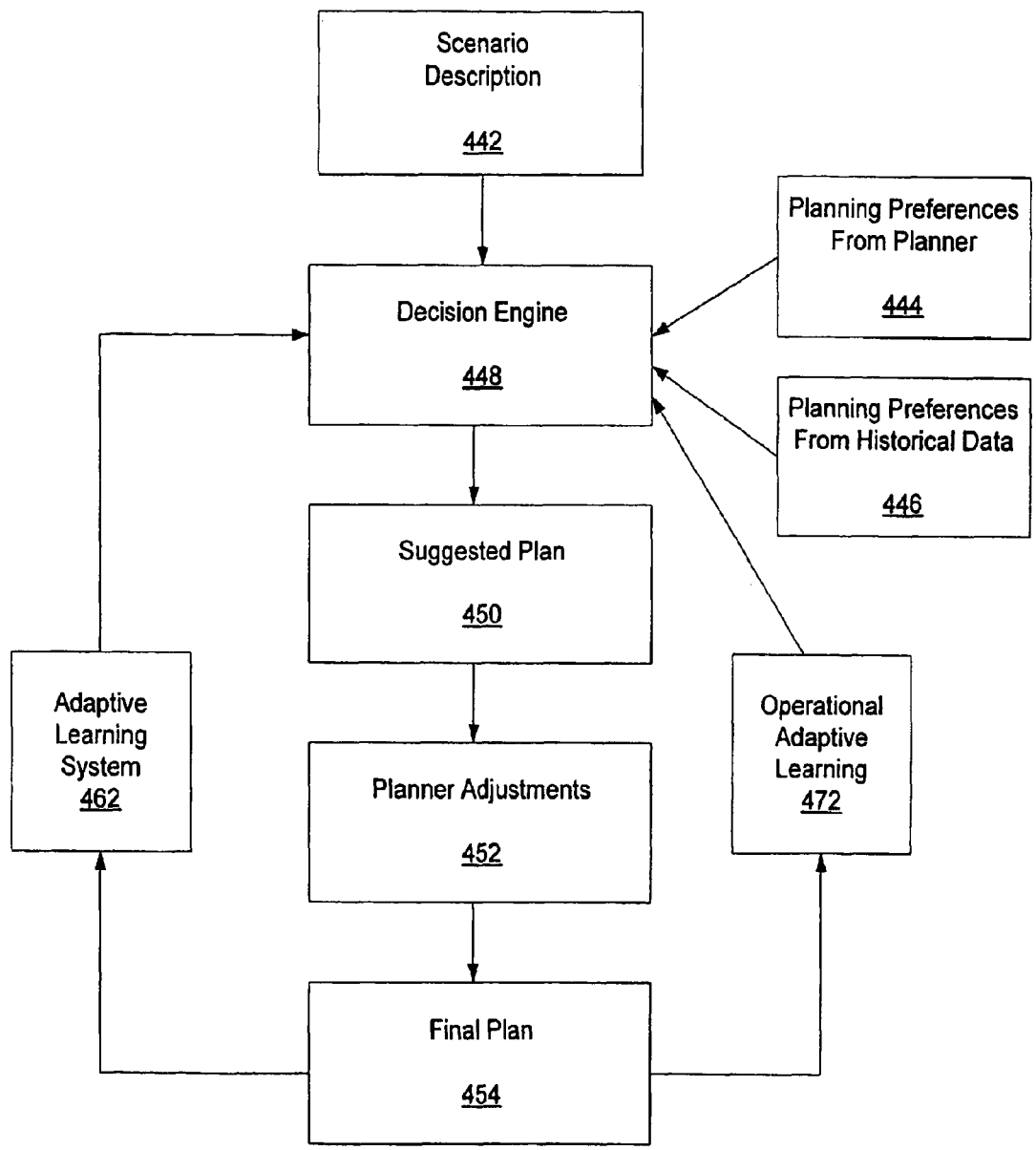
FIG. 3 is a flowchart illustrating a production planning system having an operational adaptive learning in accordance with one embodiment of the present invention.

FIG. 3 is a flowchart illustrating a production planning system 470 having an operational adaptive learning in accordance with one embodiment of the present invention. The flowchart illustrated in FIG. 2 is similar to the flowchart illustrated in FIG. 3 except block 472. At block 472, an operational adaptive learning allows an evaluator to objectively evaluate actual results from the production line against the planning preferences. The evaluator may update the planning preferences based on the actual results of the production line.

Figure 4:
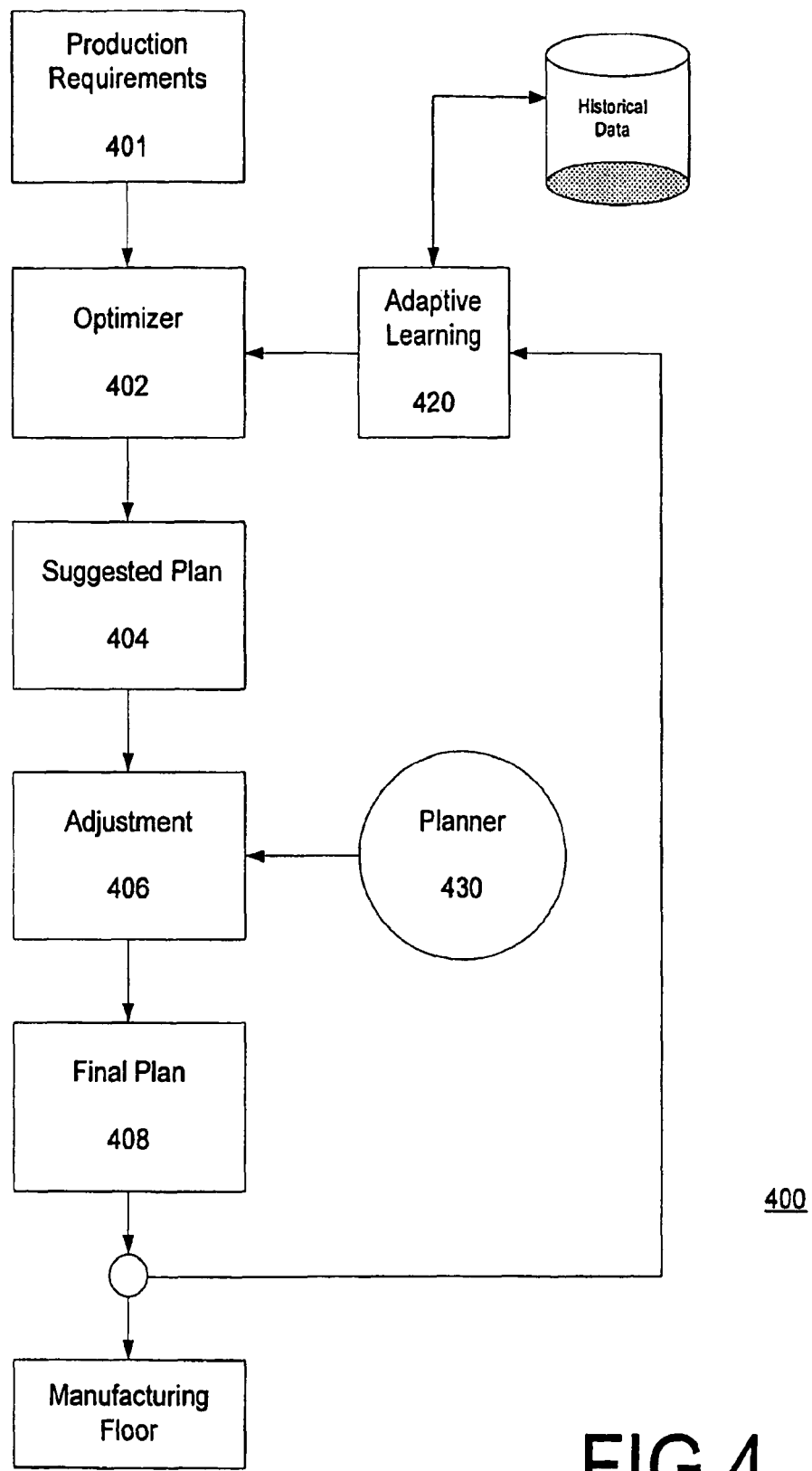
FIG. 4 is a block diagram illustrating a process of adaptive learning in accordance with one embodiment of the present invention.

FIG. 4 is a block diagram of production planning system 400 having an adaptive learning system in accordance with one embodiment of the present invention. In one embodiment, production planning system 400 is expressed in computer executable instructions, which causes a general purpose or special purpose computer to perform the steps set forth in the production planning system 400. Alternatively, the steps of production planning system 400 may be performed by specific hardware components, or by a combination of computer programming code and custom hardware components.

At block 401, the process obtains production requirements, which includes objects or goods, time limitations, ingredients, etc. In one embodiment, the process identifies the origin of production requirements, which may come from a local system or a remote system through the Internet. Upon receipt of production requirements, the process proceeds to block 402.

At block 402, the process obtains planning preferences from an adaptive learning system in accordance with the production requirements. In one embodiment, the adaptive learning system identifies and fetches relevant historical planning data according to the production requirements. Historical data may be stored in a local database or in a remote database.

At block 404, the process receives various parameters including production requirements, planning preferences, etc. A suggested plan is generated in accordance with the various parameters.

At block 406, the process allows a planner 430 to adjust the suggested plan. In one embodiment, an experienced planner 430 can manually change certain parameters to improve the production plan. For example, the planner 430 may know the recent labor issues with a particular supplier and it is desirable to avoid these risks in an effective production plan.

At block 408, upon completion of adjustment by a planner, the process provides a final production plan. The final production plan or schedule is ready to be executed at a manufacturing production line. In one embodiment, the manufacturing floor may continuously receive real-time updates from the production planning system to improve the efficiency of the production process. In one embodiment, the final plan is forwarded to the adaptive learning system for updating planning preferences in accordance with the final production plan.

At block 420, the process evaluates the final production plan and captures adjustments made by the planner. Some historical data may be updated according to the final production plan. The adaptive learning system 420 also provides parameters such as planning preferences to the decision support optimizer 402. It should be obvious to one skilled in the art that it does not depart from the scope of the present invention if additional blocks are added to or subtracted from the process 600.

Figure 5:
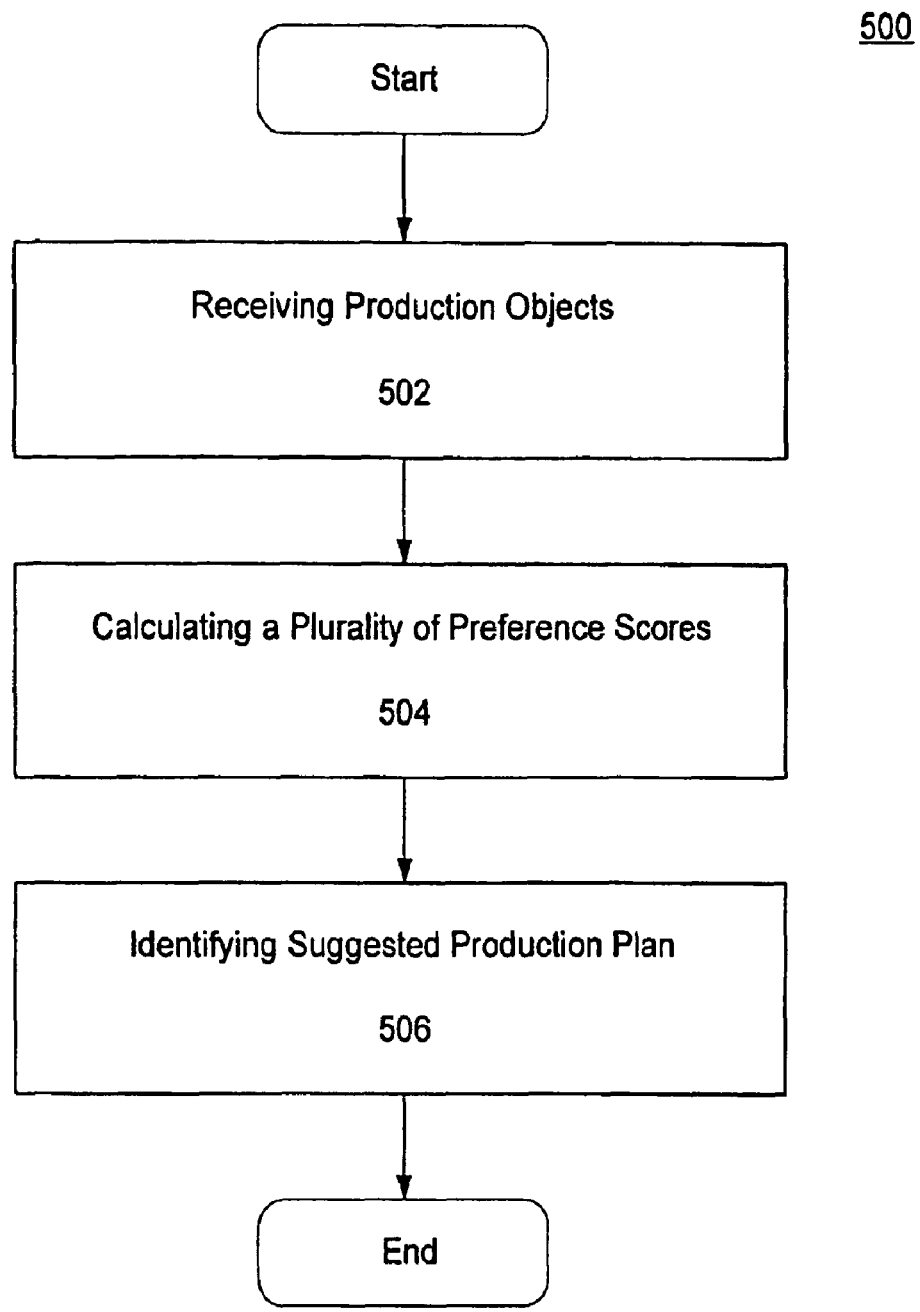
FIG. 5 is a flowchart illustrating a process of adaptive learning in accordance with one embodiment of the present invention.

FIG. 5 is a flowchart 500 illustrating a process of adaptive learning in accordance with one embodiment of the present invention. At block 502, the process receives production objects. Production objects, in one embodiment, include at least a portion of the production requirements such as tasks, time constraints, and other characteristics of each task. The information about production objects may be obtained from the host computer and/or from a remote computer via the Internet.

At block 504, the process calculates a plurality of preference scores according to various parameters such as transitional preference values. In one embodiment, a statistical algorithm is used to calculate the preference scores. In another embodiment, the process is capable of providing preference scores for two adjacent production tasks. In yet another embodiment, the process is able to provide preference scores for a sequence of production tasks.

At block 506, the process identifies and provides a suggested production plan in response to the preference scores and planning preferences. It should be obvious to one skilled in the art that it does not depart from the scope of the present invention if additional blocks are added to or subtracted from the process 500.

The adaptive learning system is a part of the production planning system that generates effective production schedules or production plans. In one embodiment, a production plan specifies a sequence in which the factory should execute in order to meet the production requirements. For example, a factory follows various manufacturing operations in accordance with production requirements (or production tasks). Table 1 illustrates several parameters:

TABLE 1

| SKU | Quantity |
| --- | --- |
| P1 | 1400 Cases |
| P3 | 4700 Cases |
| P6 | 2500 Cases |
| P7 | 3600 Cases |

Wherein SKU refers to Stock Keeping Unit, which is generally a unique identifier for each item. If the factory has one production line, an exemplary production plan is illustrated in Table 2.

TABLE 2

| Line | Start | SKU | Quantity |
| --- | --- | --- | --- |
| L1 | 06:00 | P6 | 2500 Cases |
| L1 | 09:30 | P3 | 4700 Cases |
| L1 | 13:00 | P1 | 1400 Cases |
| L1 | 15:00 | P7 | 3600 Cases |

To create an efficient production plan, various considerations need to be balanced. One consideration is to group the production items that share a substantially similar characteristic. For example, it may be desirable to group the production of items that share similar ingredients since switching ingredients requires cleaning and reconfiguring the production line. Also, it takes time and labor to switch from one ingredient(s) to another ingredient(s). Another consideration may be to group the production of items that require the same specialized labor, since under-utilizing such labor can incur unnecessary costs. Other considerations may involve selecting the production lines, time limitations, etc.

Figure 6:
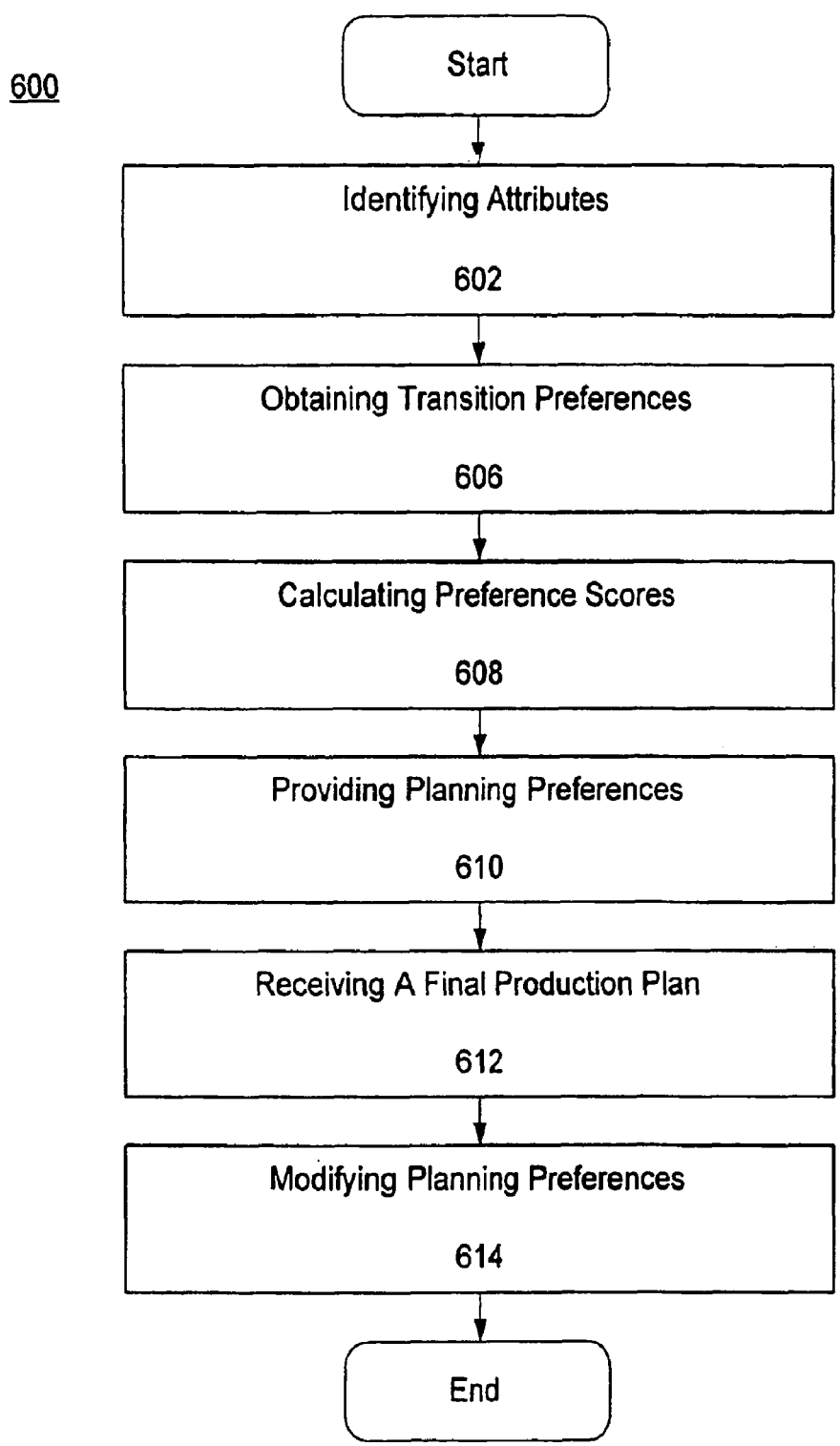
FIG. 6 is a flowchart showing various steps to implement a process of adaptive learning in accordance with one embodiment of the present invention.

FIG. 6 is a flowchart having more detailed steps of an adaptive learning process 600 in accordance with one embodiment of the present invention. At block 602, the process identifies a plurality of attributes associated with production objects or tasks. In one embodiment, the production objects are identified in the production requirements. As mentioned earlier, the planning preferences related to grouping of production tasks can be quantified using the concept of attribute. Attributes are characteristics of an object or item that influences production planning decisions. An experienced planner concerns a particular set of attributes that may be unique to his or her manufacturing operations. For example, the attributes for roasting coffee may be Roast, Package and Channel. Each effective production plan may contain a sequence of production tasks so that tasks with similar attributes are grouped together to improve the throughput and cost-effectiveness of the manufacturing operation.

At block 606, the process identifies and obtains transition preference values in accordance with the plurality of attributes. The planning preferences associated with a given attribute can be quantified by specifying transition preferences. The term transition preferences and transition preference values may be used interchangeably herein. For example, attribute A has the possible values $A_1, A_2, \ldots, A_N$. The transition preference for switching from producing an item with attribute value $A_i$ to producing an item with attribute value $A_j$ is denoted by $TP(A_i \Rightarrow A_j)$. For example, a higher value of $TP(A_i \Rightarrow A_j)$ indicates a stronger planning preference for scheduling production of an item with the attribute value $A_j$ immediately after production of an item with the attribute value $A_i$. In one embodiment, the transition preferences for an attribute can be specified by the planner, or they can be computed from historical planning data.

At block 608, the process calculates a plurality of preference scores for two adjacent production tasks and/or a sequence of production tasks. The preference score for switching from producing a first item to producing a second item is computed by adding the transition preference for each attribute. For example, first item 1, has attribute values:
Attribute $A=A_1$
Attribute $B=B_1$
Attribute $C=C_1$
...

And, second item $I_2$ has attribute values:
Attribute $A=A_2$
Attribute $B=B_2$
Attribute $C=C_2$
...

Then the preference score $PS(I_1 \Rightarrow I_2)$ for switching from producing the first item $I_1$ to producing the second item $I_2$ is:

$$PS(I_1 \Rightarrow I_2) = TP(A_1 \Rightarrow A_2) + TP(B_1 \Rightarrow B_2) + \ldots$$

The preference score for a sequence of production tasks is computed by adding together the preference scores for adjacent production tasks in a sequence. For example, a sequence of production tasks involves production of a first item $I_1$, followed by production of a second item $I_2$, followed by production of a third item $I_3$, etc. The equation of preference score $PS(I_1 \Rightarrow I_2 \Rightarrow I_3 \Rightarrow \ldots)$ is:

$$PS(I_1 \Rightarrow I_2 \Rightarrow I_3 \Rightarrow \ldots) = PS(I_1 \Rightarrow I_2) + PS(I_2 \Rightarrow I_3) + PS(I_3 \Rightarrow I_4) + \ldots$$

At block 610, the process evaluates the preference scores and production considerations. In one embodiment, a higher value of a preference score indicates a stronger planning preference for scheduling production. The process provides planning preferences according to the plurality of preference scores.

At block 612, the process receives a final production plan. In one embodiment, the adaptive learning system facilitates continuous feedback of the planning process to enhance the effectiveness of the production plan. In another embodiment, the adaptive learning system enables the production planning system to continuously learn.

At block 614, the process modifies the planning preferences according to the final production plan. In one embodiment, the process captures the knowledge of an experienced planner by identifying the adjustments made by the planner and updating the planning preferences in accordance with the adjustments. In one embodiment, the adaptive learning system updates the planning preferences when it is invoked by an operator or system. In another embodiment, the adaptive learning system updates the planning preferences at pre-defined times. In yet another embodiment, the adaptive learning system updates the planning preferences on specified events e.g. when a plan is forwarded for execution. It should be obvious to one skilled in the art that it does not depart from the scope of the present invention if additional blocks are added to or subtracted from the process 600.

Figure 7:
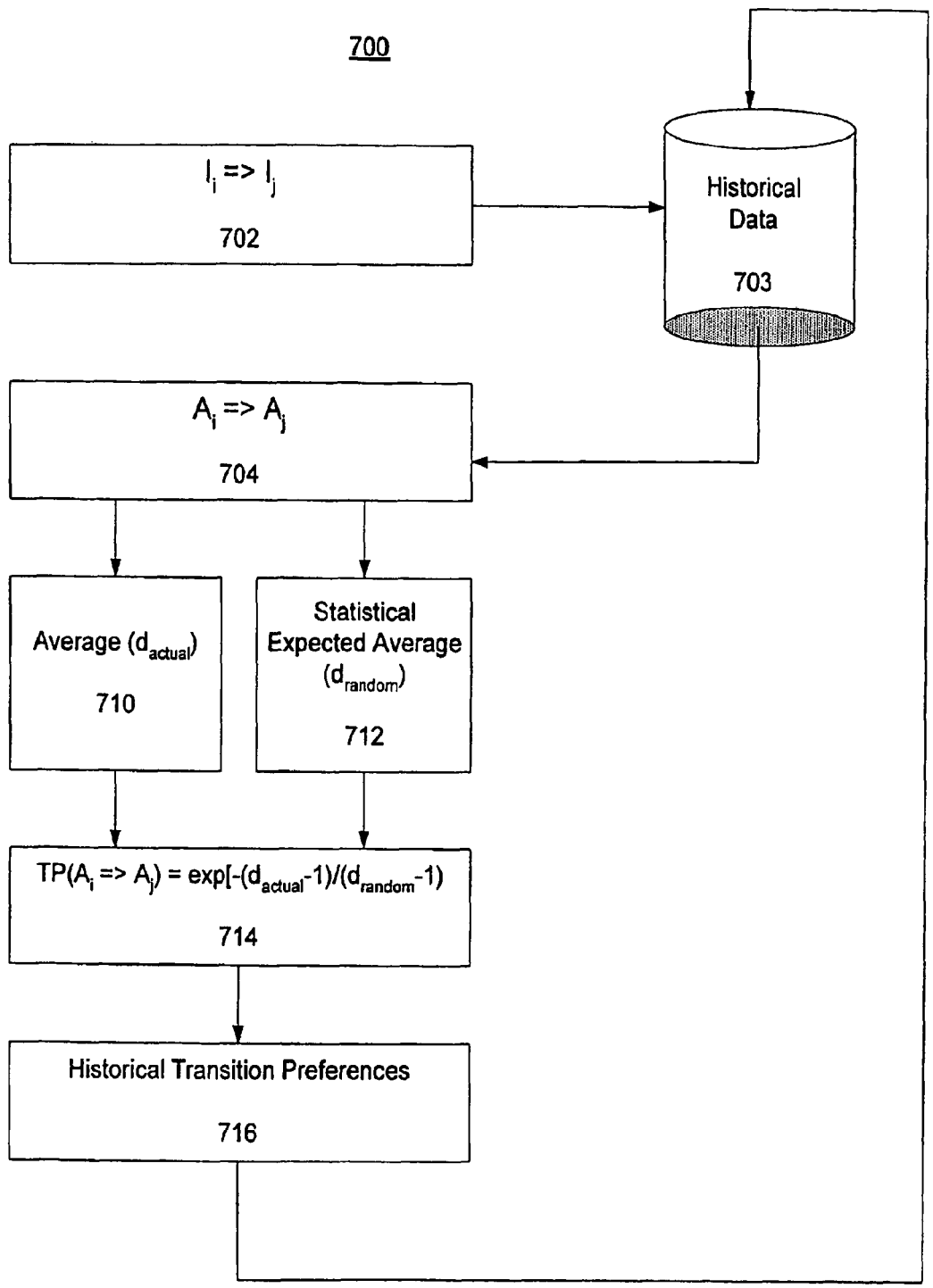
FIG. 7 is a flowchart illustrating an example of calculating a transition preference value in accordance with one embodiment of the present invention.

FIG. 7 is a flowchart illustrating an example of data processing 700 for calculating a transition preference value in accordance with one embodiment of the present invention. At block 702, the process identifies first item $I_i$ and second item $I_j$, wherein item is the object to be manufactured. In one embodiment, $I_i$ and $I_j$ are derived from production requirements.

At block 703, the process identifies and fetches relevant parameters from historical data storage in response to $I_i$ and $I_j$. The relevant parameters include information such as attributes and planning preferences. In one embodiment, the historical data storage is located in a local system. In another embodiment, the historical data storage is located in a remote system.

At block 704, the process receives attributes $A_i$ and $A_j$ associated with $I_i$ and $I_j$, respectively. $A_i$ and $A_j$ are subsequently forwarded to block 710 and 712.

At block 710, the process obtains an average transition preference value for $A_i$ and $A_j$. For example, the distance between two attribute values $A_i$ and $A_j$ in the sequence may be the difference in the indexes of those attribute values. $d_{actual}$ is referred to the average distance from an occurrence of the attribute value $A_i$ in the sequence to the subsequent occurrence of the attribute value $A_j$. For example, if every occurrence of $A_i$ is immediately followed by an occurrence of $A_j$, then $d_{actual}=1$.

At block 712, the process obtains a statistically expected transition preference value for $A_i$ and $A_j$. Let $d_{random}$ be the statistically expected average distance if the attribute values in the sequence are re-distributed to form a randomized sequence. In one embodiment, $d_{random}$ can be computed by performing randomizations and then the process identifies the mean of $d_{actual}$ obtained over all randomizations.

At block 714, the process computes the transition preference value using the formula: $TP(A_i \Rightarrow A_j) = \exp[-(d_{actual}-1)/(d_{random}-1)]$, wherein the exp[ ] represents the exponential function.

At block 716, the process receives the historical transition preference values from block 714. These historical transition preferences can then be provided as parameters to decision support systems, such as a system to automatically generate the preferred sequence. In one aspect, the adaptive learning of transition preferences can be accomplished by automatically updating the historical transition preferences upon the occurrence of a triggering event.

The production planner having an adaptive learning module, in one embodiment, is implemented in a computer program, which can be loaded to a general-purpose computer to perform the process of planning of manufacturing schedules. The production planner allows a planner to explicitly express preferences and outputs a manufacturing schedule based on the planner's preferences. The preferences may include equipment preferences, shift preferences, sequencing preferences, and desired grouping of tasks with similar attributes. In another embodiment, the production planner is implemented in an integrated circuit (IC). In yet another embodiment, the production planner is implemented in a combination of IC and programming code.

Figure 8:
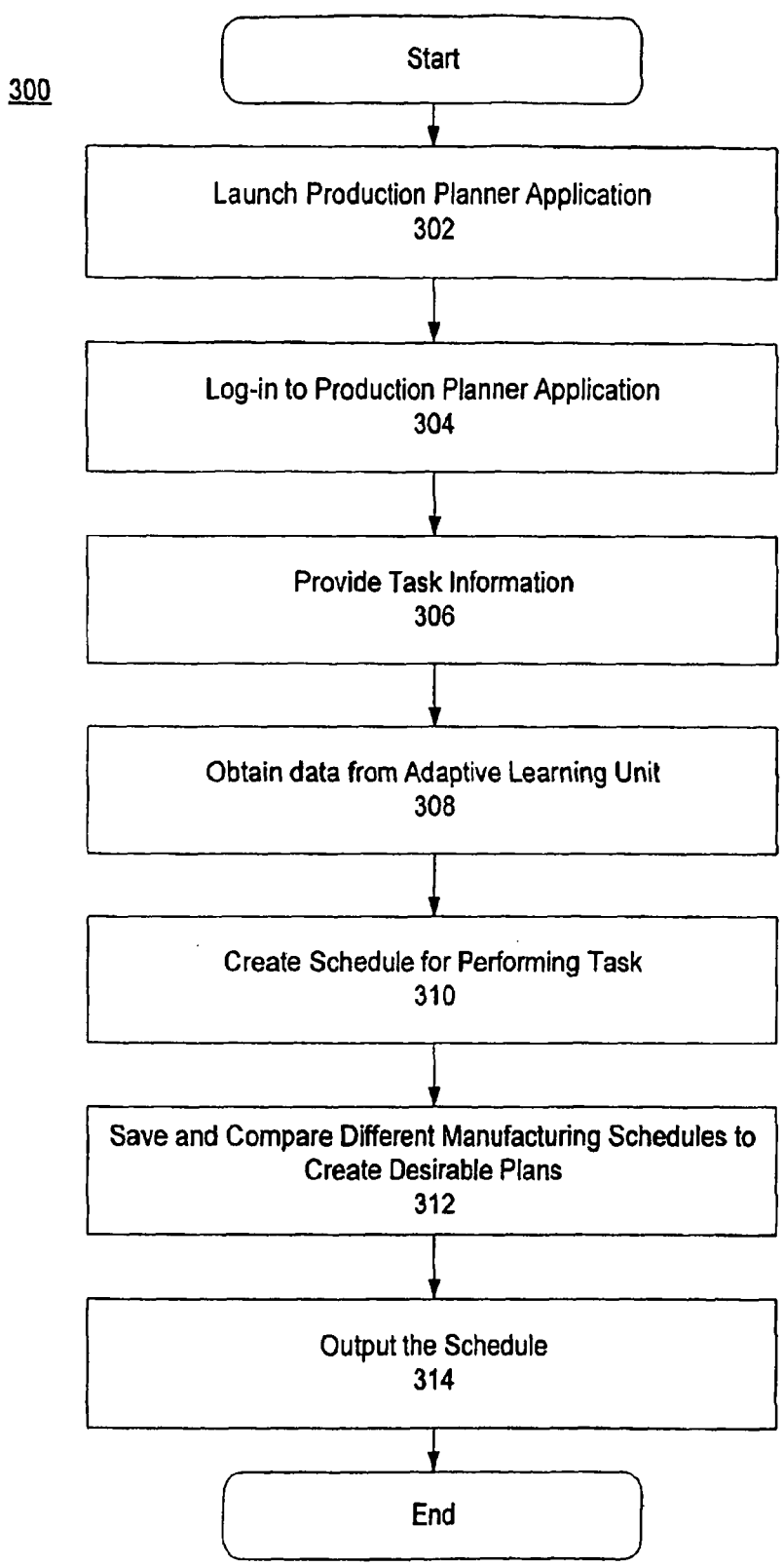
FIG. 8 illustrates a computer system in which the production planner may be implemented in accordance with one embodiment of the present invention.

FIG. 8 is a flowchart illustrating a process of creating and modifying manufacturing schedules using production planner 300 in accordance with one embodiment of the present invention. At block 302, the process launches an application of production planner 300. In one embodiment, the application is activated through a remote client system connected through the Internet. In another embodiment, the application of production planner 300 is launched by a client system within a local-area network. In yet another embodiment, the application of production planner 300 is launched by the system that contains production planner 300.

At block 304, the process activates a login mechanism. The login mechanism requires a user to input or sign-in his or her account information. Account information, such as user identifier, password, et cetera, contains information associated with the user or client. Upon verifying the account information, the process moves to the next block.

At block 306, the user or planner supplies task information, which is also known as production requirements. In one embodiment, the task information is obtained directly from another system without user intervention. The task information identifies types of products or objects to be manufactured. The task information further includes quantities of objects or products to be manufactured, required shipment dates, production lines and equipment assigned to manufacture the products, changeover requirements, et cetera. Changeover refers to the activities necessary to convert a production line from manufacturing a first product to a second product.

At block 308, the process obtains attributes according to the task information. After identification of the attributes, the process obtains preference scores according to the attributes. The process uses preference scores to identify a plurality of planning preferences. In one embodiment, adaptive learning module retrieves some data from a past planning database. Upon the process obtaining the data from adaptive learning module, the process moves to the next step.

At block 310, the process creates a suggested manufacturing schedule in response to the data obtained from the adaptive learning module. In one embodiment, production planner retrieves various control information such as the user's desirable preferences, displays a schedule for performing the task and also allows the user to modify the schedule. In one embodiment, generation and modification of the schedule can be interactively performed on a graphical planning board.

At block 312, the user can save and compare different manufacturing schedules to create one or more desirable plans. Production planner 300 allows a user or a skillful planning expert to alter the manufacturing schedules guided by instantaneous messages or warnings resulting from the user's movement of task(s).

At block 314, the process outputs a manufacturing schedule, which the user concludes is the most desirable plan under the condition of available data. The process proceeds to block 312 if the user wants to further refine the schedule.

To implement these steps, production planner 300 may include various commercially available components. In one embodiment, production planner 300 includes Java Applets, JSPs, Servlets, Standard Tag Libraries, Java components, and SQL database table for implementing and creating manufacturing schedules. In this embodiment, Java Applets are used to improve user interactions with the client browser. Java components include simple beans, helpers, and/or business services. Servlets are used to make initial contact for handling requests from the client. Standard Tag Libraries are needed to minimize scriptlet code inside of the JSPs. SQL database table is used for data storage. It should be obvious to one skilled in the art that it does not depart from the scope of the present invention if additional components are added to or subtracted from the above-described components.

Figure 9:
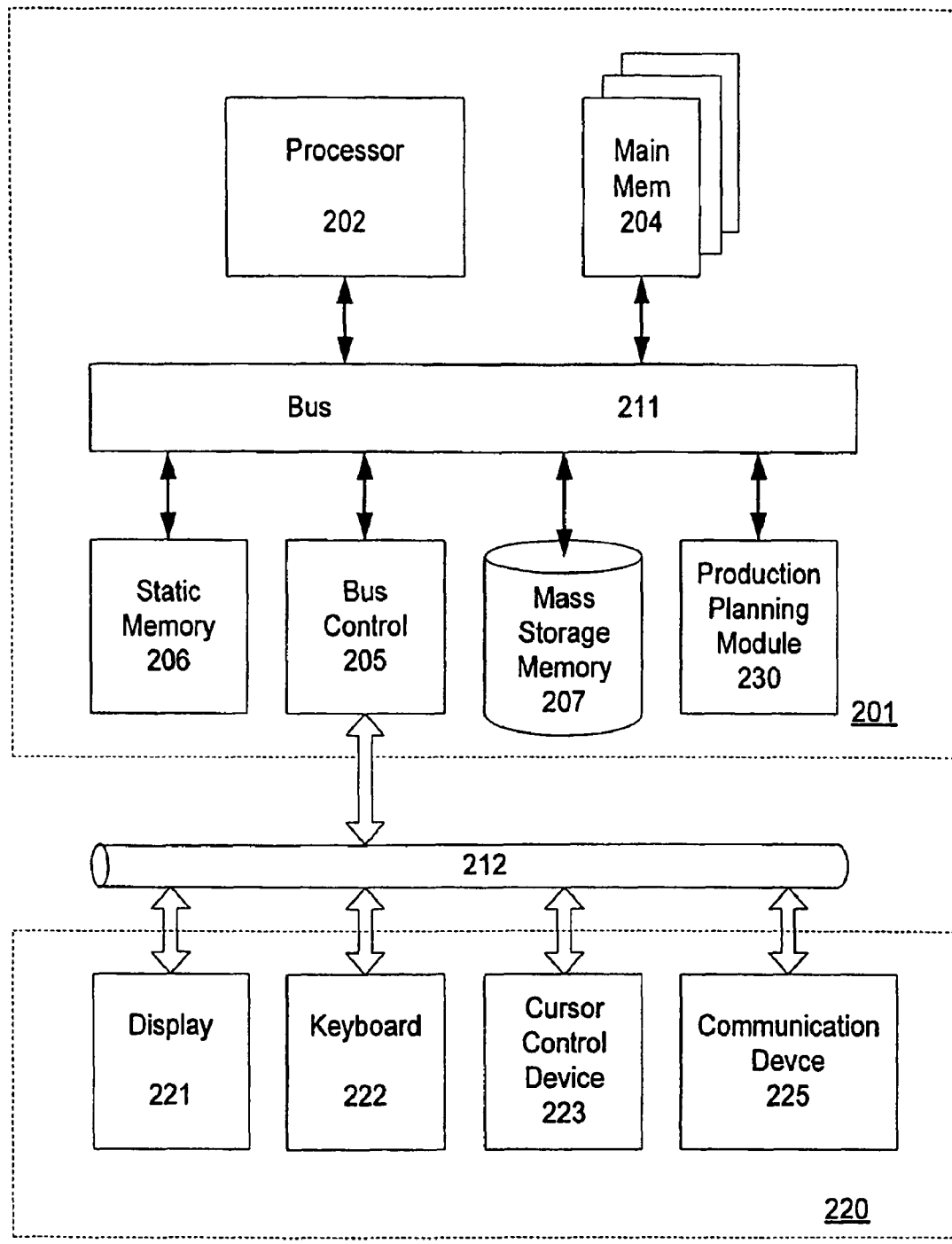
FIG. 9 is a flowchart illustrating a process of creating and modifying a manufacturing schedule using the production planner in accordance with one embodiment of the present invention.

FIG. 9 illustrates an example of a computer system 200 in which the features of the present invention may be implemented. Process of the production planner can be implemented in any processor-based computer system, such as a PC, a workstation, or a mainframe computer. It will be apparent to those of ordinary skill in the art that other alternative computer system architectures may also be employed. It should also be noted that the terms manufacturing scheduling, manufacturing planning, manufacturing scheduling and planning, production planning, production scheduling, and production planning and scheduling could be used interchangeably hereinafter.

Referring back to FIG. 9, computer system 200 includes a processing unit 201, an interface bus 212, and an input/output ("IO") unit 220. Processing unit 201 includes a processor 202, a main memory 204, a system bus 211, a static memory device 206, a bus control unit 205, a mass storage memory 207, and a production planning module 230. Bus 211 is used to transmit information between various components and processor 202 for data processing. Processor 202 may be any of a wide variety of general-purpose processors or microprocessors such as Pentium™ microprocessor, Motorola™ 68040, or Power PC™ microprocessor.

Main memory 204, which may include multiple levels of cache memories, stores frequently used data and instructions. Main memory 204 may be RAM (random access memory), MRAM (magnetic RAM), or flash memory. Static memory 206 may be a ROM (read-only memory), which is coupled to bus 211, for storing static information and/or instructions. Bus control unit 205 is coupled to buses 211-212 and controls which component, such as main memory 204 or processor 202, can use the bus. Bus control unit 205 manages the communications between bus 211 and bus 212. Mass storage memory 207, which may be a magnetic disk, an optical disk, hard disk drive, floppy disk, CD-ROM, and/or flash memories for storing large amounts of data. Production planning module 230, which includes an adaptive learning module, may in one embodiment, be an independent component (IC) that performs functions of planning manufacturing schedules. In another embodiment, production planning module 230 may reside within the processor 202, main memory 204, and/or static memory 206.

I/O unit 220, in one embodiment, includes a display 221, keyboard 222, cursor control device 223, and communication device 225. Display device 221 may be a liquid crystal device, cathode ray tube ("CRT"), touch-screen display, or other suitable display device. Display 221 projects or displays images of a graphical planning board. Keyboard 222 may be a conventional alphanumeric input device for communicating information between computer system 200 and computer operator(s). Another type of user input device is cursor control device 223, such as a conventional mouse, touch mouse, trackball, or other type of cursor for communicating information between system 200 and user(s).

Communication device 225 is coupled to bus 211 for accessing information from remote computers or servers, such as server 104 or other computers, through wide-area network 102. Communication device 225 may include a modem or a network interface device, or other similar devices that facilitate communication between computer 200 and the network. Computer system 200 may be coupled to a number of servers 104 via a network infrastructure.

The present invention includes various processing steps, which will be described below. The steps of the present invention may be embodied in machine or computer executable instructions. The instructions can be used to cause a general purpose or special purpose system, which is programmed with the instructions to perform the steps of the present invention. Alternatively, the steps of the present invention may be performed by specific hardware components that contain hard-wired logic for performing the steps, or by any combination of programmed computer components and custom hardware components. While embodiments of the present invention will be described with reference to the Internet, the method and apparatus described herein is equally applicable to other network infrastructures or other data communications environments.

Figure 10:
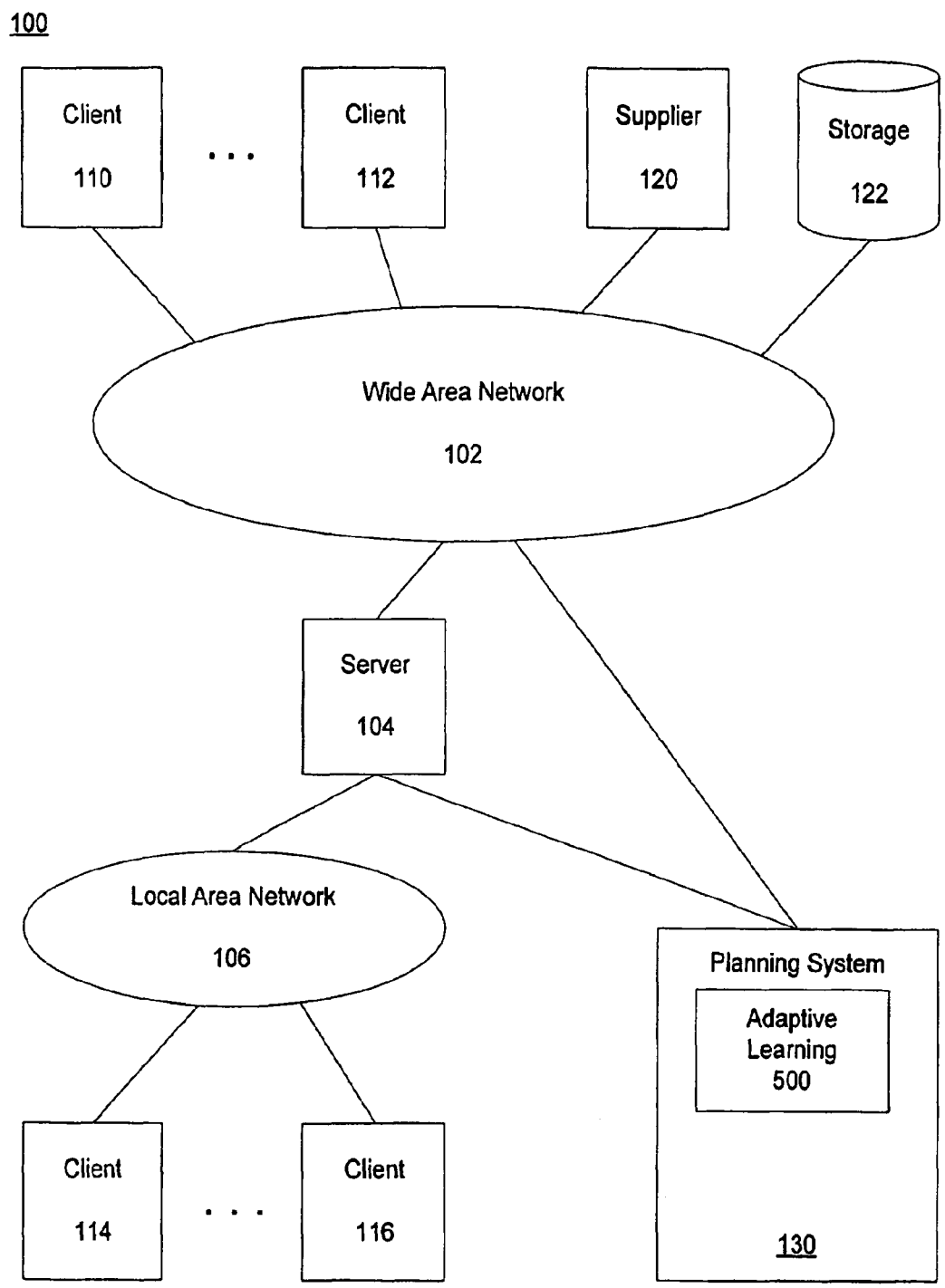
FIG. 10 is a computer network topology illustrating a network environment in which the production planner can be implemented in accordance with one embodiment of the present invention.

FIG. 10 is a computer network topology 100 illustrating a network environment in which the production planner can be implemented in accordance with one embodiment of the present invention. In this network environment, a planning system 130 is coupled to a wide-area network 102. Wide-area network 102 includes the Internet, or other proprietary networks including America On-Line™, SBC™, Microsoft Network™, and Prodigy™ Wide-area network 102 may further include network backbones, long-haul telephone lines, Internet service providers, various levels of network routers, and other means for routing data between computers. Planning system includes the production planner, which may be implemented either in hardware or software or a combination of hardware and software. Planning system 130 includes an adaptive learning module 500. Planning system 130 is capable of accepting user's input during the process of planning a manufacturing schedule.

Server 104 is coupled to wide-area network 102 and it is, in one aspect, used to route data to clients 114-116 through a local-area network ("LAN") 106. The LAN connection allows client systems 114-116 to communicate with each other through LAN 106 and to communicate with planning system 130 via LAN 106 and server 104. Using conventional network protocols, planning system 130 may communicate through wide-area network 102 to a plurality of client computer systems 110-112, supplier system 120 and storage device 122. For example, client system 110 is connected directly to wide-area network 102 through direct or dial-up telephone or other network transmission lines. Alternatively, clients 110-112 may be connected through wide-area network 102 using a modem pool.

Using one of a variety of network connection means, planning system 130, which could be a personal computer ("PC"), a mini-computer, a server, a workstation, or a mainframe computer, can support multiple applications of production planner to clients across the network. In one embodiment, planning system 130 may store and retrieve various electronic information (or data) in storage system 122 through wide-area network 102. Planning system 130 is capable of obtaining various information such as supplier's inventory from supplier system 120 via the network. It should be obvious to one skilled in the art that it is within the scope of the present invention if additional systems are added to or subtracted from the computer network 100.

In the foregoing specification the invention has been described with reference to specific exemplary embodiments thereof. It will, however, be evident that various modifications and changes may be made thereto without departing from the broader scope of the invention. The specification and drawings are, accordingly, to be regarded in an illustrative rather than restrictive sense.

What is claimed is:

1. A computer-implemented method of creating and modifying manufacturing schedules comprising:
   starting a production planner application using a computer;
   accepting inputs, using the computer, regarding production requirements, including inputs of types and quantities of products to be manufactured, wherein the products each include one or more attributes;
   obtaining data, using the computer, from an Adaptive Learning Unit, including product preference data that specifies manufacturing sequence preferences based on data including the product attributes and east manufacturing schedule data; and
   creating a manufacturing schedule, using the data obtained from the Adaptive Learning Unit, wherein the manufacturing schedule specifies a sequence of production tasks for manufacturing the products and the manufacturing schedule is created using the computer.

2. The computer-implemented method of claim 1, further comprising:
   outputting said manufacturing schedule in a machine-readable format, for use by a manufacturing system.

3. The computer-implemented method of claim 1, further comprising:
   outputting said manufacturing schedule in a human-readable format.

4. The computer-implemented method of claim 3, further comprising:

retrieving past manufacturing schedules from a data storage; and outputting a comparison of said human-readable manufacturing schedule and said past manufacturing schedules.

5. The computer-implemented method of claim 4 further comprising:

accepting inputs regarding changes to said manufacturing schedule.

6. The computer-implemented method of claim 5 further comprising:

modifying said manufacturing schedule based on said changes to said manufacturing schedule; and storing said modified manufactured schedule in a data storage.

7. The computer-implemented method of claim 1, wherein the data obtained from the Adaptive Learning Unit comprises at least one preference score for a suggested production plan.

8. The computer-implemented method of claim 7, wherein the at least one preference score is based on a transition preference value obtained from a historical data storage.

9. The computer-implemented method of claim 1, wherein the data obtained from the Adaptive Learning Unit comprises preference scores for at least two adjacent production tasks.

10. The computer-implemented method of claim 1, wherein the data obtained from the Adaptive Learning Unit comprises preference scores for a sequence of production tasks.

11. A system for creating and modifying manufacturing schedules comprising:

providing a computer having:
 a processor;
 a memory; and
 a computer-readable storage medium storing a plurality of instructions which, when executed by the processor, cause the processor to perform a method comprising:

starting a production planner application;

accepting inputs regarding production requirements, including inputs of types and quantities of products to be manufactured, wherein the products each include one or more attributes;

obtaining data from an Adaptive Learning Unit, including product preference data that specifies manufacturing sequence preferences based on data including the product attributes and past manufacturing schedule data; and creating a manufacturing schedule, using the data obtained from the Adaptive Learning Unit, wherein the manufacturing schedule specifies a sequence of production tasks for manufacturing the products and the manufacturing schedule is created using the computer.

12. The system of claim 11, the method further comprising:

outputting the manufacturing schedule in a human-readable format;

retrieving past manufacturing schedules from a data storage; and outputting a comparison of the human-readable manufacturing schedule and the past manufacturing schedules.

13. The system of claim 11, wherein the data obtained from the Adaptive Learning Unit comprises at least one preference score for a suggested production plan.

14. The system of claim 11, wherein the data obtained from the Adaptive Learning Unit comprises preference scores for at least two adjacent production tasks.

15. The system of claim 11, wherein the data obtained from the Adaptive Learning Unit comprises preference scores for a sequence of production tasks.

16. A computer-readable storage medium storing a plurality of instructions which, when executed by a processor, cause the processor to perform a method comprising:

starting a production planner application;

accepting inputs regarding production requirements, including inputs of types and quantities of products to be manufactured, wherein the products each include one or more attributes;

obtaining data from an Adaptive Learning Unit, including product preference data that specifies manufacturing sequence preferences based on data including the product attributes and past manufacturing schedule data; and creating a manufacturing schedule, using the data obtained from the Adaptive Learning Unit wherein the manufacturing schedule specifies a sequence of production tasks for manufacturing the products and the manufacturing schedule is created using the computer.

17. The computer-readable storage medium of claim 16, the method further comprising:

outputting the manufacturing schedule in a human-readable format;

retrieving past manufacturing schedules from a data storage; and outputting a comparison of the human-readable manufacturing schedule and the past manufacturing schedule.

18. The computer-readable storage medium of claim 16, wherein the data obtained from the Adaptive Learning Unit comprises at least one preference score for a suggested production plan.

19. The computer-readable storage medium of claim 16, wherein the data obtained from the Adaptive Learning Unit comprises preference scores for at least two adjacent production tasks.

20. The computer-readable storage medium of claim 16, wherein the data obtained from the Adaptive Learning Unit comprises preference scores for a sequence of production tasks.

* * * * *